United States Patent
Pagaza-Melero et al.

[11] Patent Number: 5,566,550
[45] Date of Patent: Oct. 22, 1996

[54] APPARATUS FOR CRYOGENICALLY SEPARATING ELASTOMERIC MATERIALS FROM METALLIC AND TEXTILE MATERIALS FORMING COMPOSITES THEREWITH

[75] Inventors: Gerardo Pagaza-Melero, Paseo de la Reforma No. 2971-12, Lomas de Vista Hermosa Cuajimalpa, C.P. 05100; Raymundo Fernandez-Y-Sosa, Naucalpan de Juarez; Santiago Bastida-Sanchez; Agustin Bastida-Sanchez, both of Almoloya de Juarez; Victor Pagaza-Melero, Unidad San Juan de Aragon; Jesus F. Pagaza-Melero, Col. Seminario, all of Mexico

[73] Assignee: Gerardo Pagaza-Melero, Lomas de Vista Hermosa Cuajimalpa, Mexico

[21] Appl. No.: 296,646

[22] Filed: Aug. 26, 1994

[51] Int. Cl.$^6$ .................................................. F17C 7/02
[52] U.S. Cl. .............................. 62/50.1; 62/320; 241/23; 241/DIG. 37
[58] Field of Search ................ 62/50.1, 320; 241/23, 241/DIG. 37

[56] References Cited

U.S. PATENT DOCUMENTS 4,667,478  5/1987  Jones, III .................... 62/50.1
5,025,632  6/1991  Spritzer ...................... 62/320
5,243,821  9/1993  Schuck et al. ............... 62/50.1

FOREIGN PATENT DOCUMENTS 181589  3/1980  Mexico .
175710  12/1991 Mexico .

Primary Examiner—Ronald C. Capossela
Attorney, Agent, or Firm—Darby & Darby, P.C.

[57] ABSTRACT

Apparatus for cryogenic separation of elastomeric products from metallic products and textile fibers combined as composite waste products having two cryogenic chambers capable of alternately receiving waste composite products to be directly contacted by a cryogenic fluid and for alternately discharging cryogenically frozen products therefrom. The chambers are in communication through a valved duct for transferring the cryogenic fluid from one chamber to the other alternately and there is a pressure equalizing valved duct to facilitate the fluid transfer in an equalized pressure environment. The chambers are rotatable through an angle sufficient to permit the cryogenic fluid transfer to be effected by gravity from one chamber to the other alternately, so that when one of the chambers is operating as a cryogenic chamber, the other can be discharged and reloaded and vice-versa. The cryogenic fluid is fed to the chamber operating as a cryogenic chamber in each cycle only to replenish the amounts lost through evaporation.

13 Claims, 4 Drawing Sheets

APPARATUS FOR CRYOGENICALLY SEPARATING ELASTOMERIC MATERIALS FROM METALLIC AND TEXTILE MATERIALS FORMING COMPOSITES THEREWITH

FIELD OF THE INVENTION

The present invention refers to a method of separating from each other different materials contained in a composite product and to an apparatus for cryogenically separating elastomeric materials, such as plastics materials and/or natural or synthetic vulcanized or non vulcanized rubbers, from metallic materials or textile fibers forming composites therewith.

BACKGROUND OF THE INVENTION

As it well known, the lack of efficient techniques and procedures for use the separation of rubbers, plastics materials and other elastomeric materials which are mixed or combined with metals and/or textile fibers, such as copper or aluminum cables lined with plastics materials, metal pieces lined with rubber and/or plastics materials, rubber products and/or plastics products containing textile fibers, tires, and the like, have caused disposal problems when said products, after their normal use, become waste products that must be disposed of as such, thus generating contamination of the environment.

Attempts made up to the present date for the separation of said materials through burning of the plastics materials and/or synthetic or natural vulcanized or non vulcanized rubbers, or melting of the same when possible, besides being very complex, slow and highly contaminating, tends to be very costly and of low efficiency. This has caused a loss of interest in the workers involved in the art for finding means to efficiently and economically carry out processes for separating, recycling and reusing plastics materials, metallic materials and/or textile materials contained in waste products of the above described type. The disposal of such products had a high consumption of energy. Also, the high concentration of contaminants which are directly emitted to the atmosphere and the costs for the maintenance of the disposal machines and the like, bring about social and economical costs that are too high to be justifiable. It is for this reason that, in order to carry out successfully the separation of the above mentioned materials in strict conformity with the ecological requirements at the worldwide level, it is important to provide a method and a separating apparatus that may permit a practically continuous, clean and efficient separation of the different materials from each other in order to accomplish the objective of at least partially recycle the same.

If the relatively large demand and variety of applications shown by plastics materials, rubbers and metallic materials at the industrial scale is taken into account, the separation and recycling of said materials contained in waste products as a composite becomes an absolutely indispensable operation, since a great variety of useful products may be obtained from said materials with a considerable reduction in the final cost.

In the above respect, Mexican Patent No. 149,975, patented on Feb. 21, 1984 to Air Products & Chemicals Inc., describes a cryogenic method and apparatus in which chunks of rubber material are sprayed with a cryogenic fluid while being conveyed in a suitable conveyor to an impact mill where they are ground and thereafter passed through a sieve in order to produce a granulated rubber material. However, although said cryogenic grinding process permits a reasonably efficient grinding of the rubber material, great losses of cryogenic fluid to the atmosphere are suffered and the problem of the separation of the rubber from other materials is not even suggested by this patent, which uses a rubber material that has been previously separated by means not described.

Mexican Patent 175,710 patented on Aug. 16, 1994 to Pagaza-Melero Gerardo, one of the inventors hereof, describes a method for the separation, by means of the use of cryogenic fluids, plastics materials and/or vulcanized or non vulcanized rubbers, both natural and synthetic, from metallic materials with which they are combined as a composite. However before the advent of the present invention no efficient apparatus existed capable of carrying out successfully said process.

In view of the above described problems existent for the disposal of the above described materials, it long has been sought to overcome the inconveniences shown by the processes of the prior art for disposing of waste products containing elastomeric materials such as rubbers, plastics and the like, combined with metallic materials and/or textile fibers, without satisfactory success. This was mainly due to the lack of interest existing in the workers involved in the art to find efficient ways to carry out said separation process, whereby an apparatus which may efficiently carry out said cryogenic separation method will be welcome as offering substantial advantages with respect to the disposal procedures existing nowadays.

OBJECTS OF THE INVENTION

Having in mind the defects of the prior art methods and apparatus for the disposal of waste products which are composites of elastomeric materials such as plastics materials and rubbers with metallic products and/or textile fibers, it is an object of the present invention to provide an apparatus for cryogenically separating plastics materials and/or natural or synthetic vulcanized or non vulcanized rubbers from metallic materials and/or textile fibers, which will operate in an optimal and practically continuous manner and will considerably reduce the consumption of the cryogenic fluid demanded by the process.

Another object of the present invention is to provide an apparatus for cryogenically separating plastics materials and/or natural or synthetic vulcanized or non vulcanized rubbers from metallic materials and/or textile fibers, which will permit the different materials, upon separation, to be reused as raw materials for the manufacture of other products on an industrial scale.

It is still one more object of the present invention to provide an apparatus for cryogenically separating plastics materials and/or natural or synthetic vulcanized or non vulcanized rubbers from metallic materials and/or textile fibers with which they are combined as a composite, which will permit the application of said apparatus, when not in use, for carrying out other cryogenic methods such as lyophilization, food preservation and the like.

BRIEF DESCRIPTION OF THE DRAWINGS

The novel features that are characteristic of the present invention are set forth with particularity in the appended claims. The invention itself, however, both as to its organization and its method of operation, together with additional objects and advantages thereof, will best be understood from the following description of specific embodiments when read in connection with the accompanying drawings, in which:

DETAILED DESCRIPTION

Figure 1:
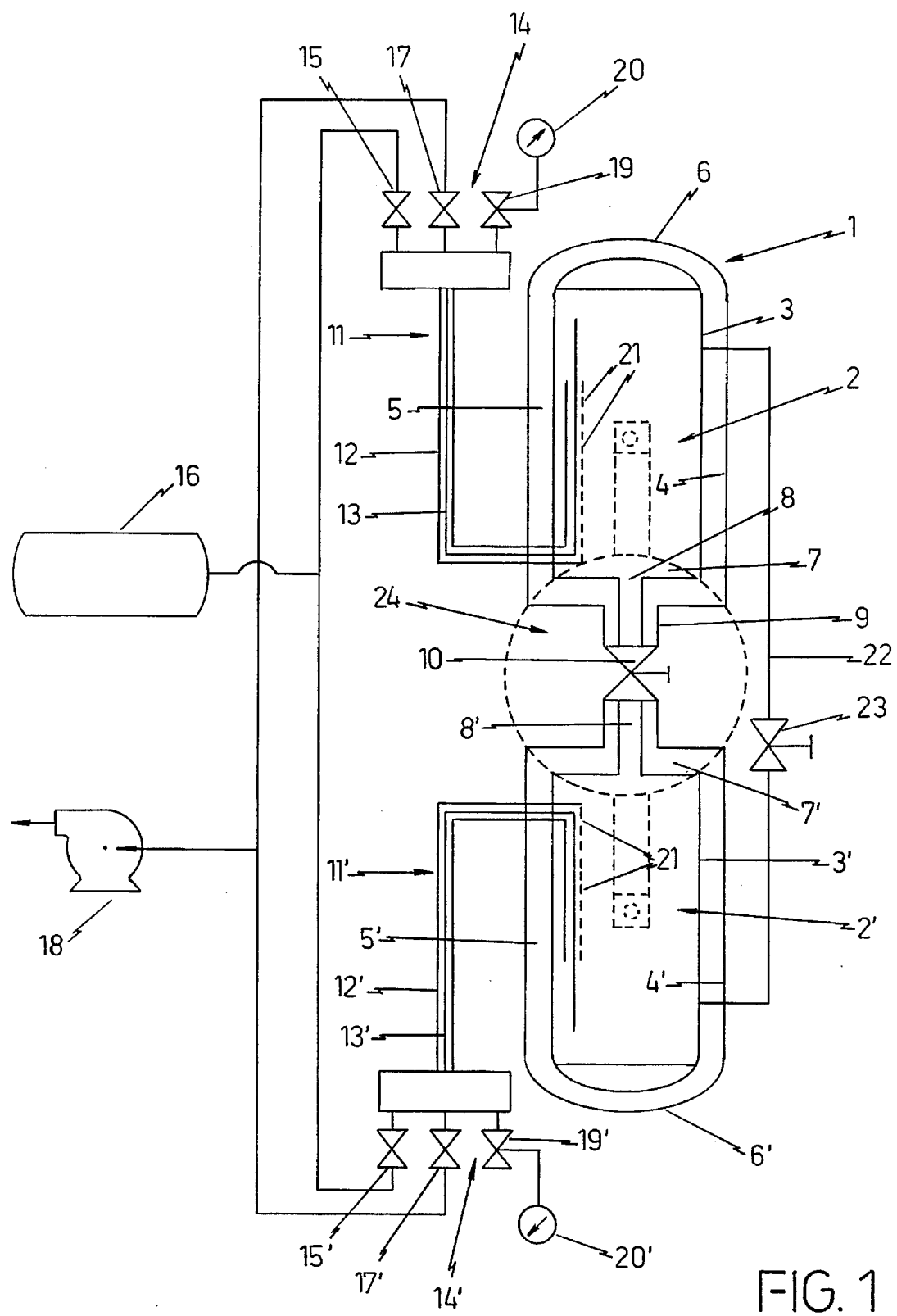
FIG. 1 is a diagrammatic cross-sectional side elevational view of an apparatus for cryogenically separating plastics materials and/or natural and synthetic vulcanized or non vulcanized rubbers from metallic materials and/or textile fibers with which they are combined as a composite, built in accordance with a first embodiment of the present invention.
Figure 2:
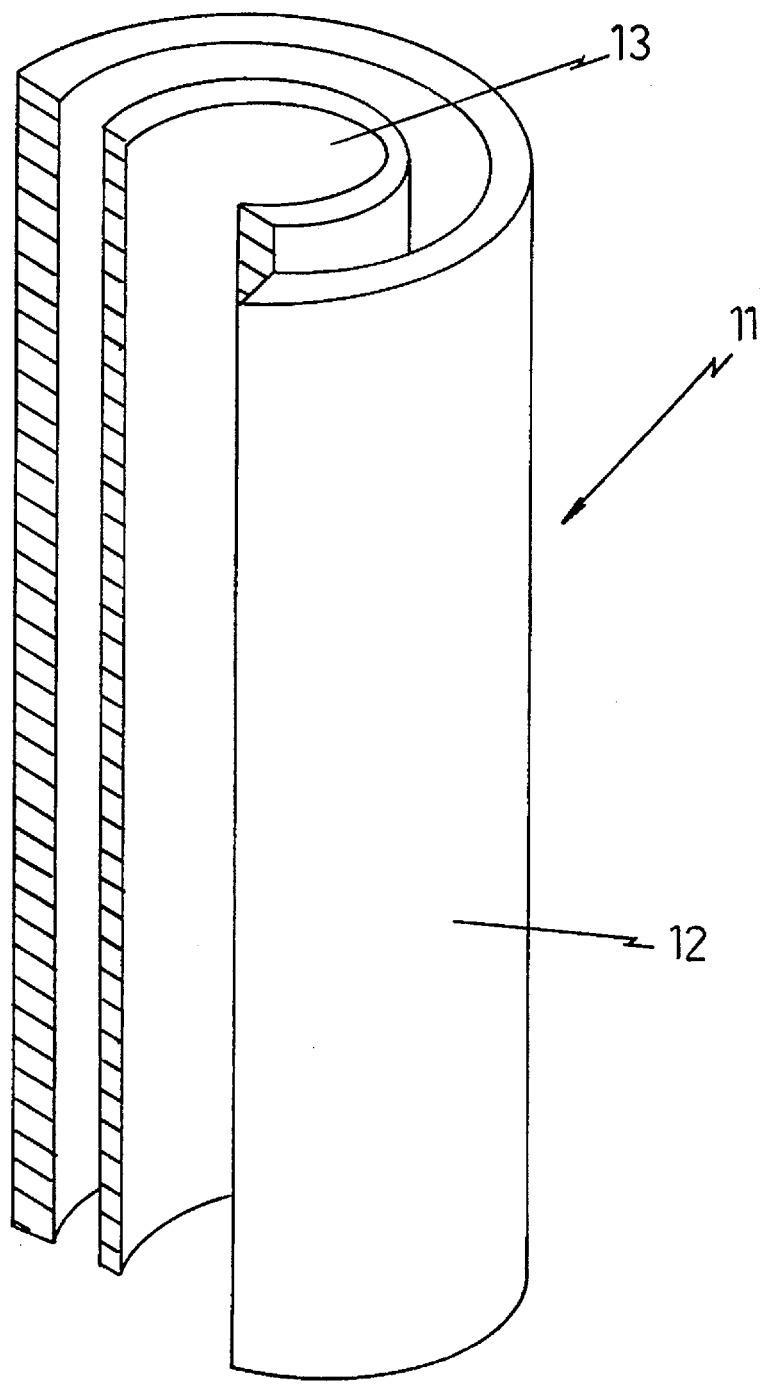
FIG. 2 is a diagrammatic perspective view of the concentric duct assembly of the apparatus of FIG. 1, with parts cut away to show inner details.

Having now more particular reference to the drawings and more specifically to FIGS. 1 and 2 thereof, there is shown an apparatus 1 for cryogenically separating plastics materials and/or natural or synthetic vulcanized or non vulcanized rubbers from metallic materials and/or textile fibers with which they are combined as a composite, built in accordance with a first specific embodiment of the present invention, which essentially comprises at least two insulated treatment chambers 2 and 2', which are arranged one above the other in a vertical symmetrical array as shown in FIG. 1. For purposes of also illustrating the manner of operation of the apparatus, the treatment chamber 2 as shown in FIG. 1 is placed at the upper position and the treatment chamber 2' is placed at the lower position, both chambers 2 and 2' being interconnected by means of an insulated duct 9 for the transference of cryogenic fluid from one chamber to the other during operation of the apparatus 1, said duct 9 including at its center portion along its length a fluid regulating valve 10 for regulating the flow of the cryogenic fluid, said valve being preferably a fast opening and closing valve.

The treatment chambers 2 and 2' may adopt any geometrical shape, but are preferably of a cylindrical form having dimensions and thickness in accordance with the specifications of the design and particularly in accordance with the pressure to be supported by the chambers, depending on the particular cryogenic fluid used. Said treatment chambers 2 and 2' may be manufactured as single walled chambers which are thermally insulated with insulating materials of suitable thickness and characteristics to avoid heat transfer towards the environment, or they may be preferably constructed as double walled chambers such as illustrated in FIG. 1, such that between the outer surface of the inner walls 3 and 3' and the inner surface of the outer walls 4 and 4', free gaps or spaces 5 and 5' will be created, which operate as insulating systems when a high vacuum is applied to said spaces. Of course, an additional layer of insulating material may be added outwardly of the spaces 5 and 5'.

The treatment chambers 2 and 2' comprise removable lids 6 and 6' respectively, said lids being of the double wall type and being also removable, and the spaces between the double walls are also evacuated, similar to the double walls of the chambers. The lids 6 and 6' are preferably of the dome type and built of materials and thickness similar to those utilized in the construction of the bodies of said chambers 2 and 2'. Lid 6 is arranged at the upper end of chamber 2 and lid 6' being arranged at the lower end of chamber 2', both lids 6 and 6' permitting the loading of the different waste products used as raw materials for the process, which contain rubber and/or plastics materials in combination with metallic materials and/or textile fibers, and also for the discharge of said materials in a crystalized state after having been subjected to direct contact with a cryogenic fluid.

The removable lids 6 and 6' are coupled to the treatment chambers 2 and 2' by means of a fast closing and opening fastening system, which may be of the autoclave or man-hole-type, although any other type of fastening system suitable for providing an hermetic seal of high efficiency between both components when subjected to pressure may be used. Said treatment chambers 2 and 2' also comprise at the ends 7 and 7' opposite to the removable lids 6 and 6', central orifices 8 and 8' for communicating with the duct 9 for the transference of cryogenic fluid from one chamber to the other.

Each one of chambers 2 and 2' is also associated with an assembly of concentric ducts 11 and 11' respectively, which perform a multifunctional operation, each one of said duct assemblies 11 and 11' comprising an outer duct 12 of larger diameter and an inner concentric duct 13 of smaller diameter housed within said duct 12, as best shown in FIG. 2. The duct assemblies 11 and 11' extend externally along the length of each of the respective treatment chambers 2 and 2', and thereafter internally in the opposite direction through a U-turn as shown in FIG. 1 of the drawings. The duct assemblies 11 and 11' are connected, at the ends thereof, located at the level of the lids 6 and 6', respectively, to distributing manifolds 14 and 14' for multiple coupling. Each one of said manifolds 14 and 14' comprising at least a cryogenic fluid injector valve 15 which is coupled to the discharge line of a storage and distribution tank 16 for cryogenic fluid, which fluid may be selected from nitrogen, helium, oxygen, air or other similar gases, but which is preferably nitrogen, in order to carry out the filling of the treatment chambers 2 and 2' through the respective duct assemblies 11 and 11'.

Respective vacuum valves 17 and 17' are also arranged in each one of said manifolds 14 and 14' to be coupled by means of suitable pipelines to a vacuum pump 18 to permit the extraction of the air from the interior of said treatment chambers 2 and 2' also through the duct assemblies 11 and 11', and safety valves 19 and 19' are also arranged in said manifolds 14 and 14', respectively, for alleviating the pressure within said treatment chambers 2 and 2' when an excess pressure is reached within the same, said safety valves 19 and 19' being connected to respective pressure gages 20 and 20'.

The duct assemblies 11 and 11' in the embodiment of the invention illustrated in FIGS. 1 and 2 of the drawings, are directly coupled on the outer walls 4 and 4' through their U-turns near the ends 7 and 7' of the treatment chambers 2 and 2' and cross the same, the arrangement of the duct assemblies 11 and 11' in the interior of the treatment chambers 2 and 2' being such that the ducts 13 and 13' operate as lines for alleviating pressure, which extend in the direction of the lids 6 and 6' until they approximately reach the ends where said lids are located, whereas the ducts 12 and 12' which operate as feed lines for cryogenic fluid and vacuum generation, extend in the same direction up to a point approximately at two thirds of the length of said chambers 2 and 2'. Ducts 12 and 12' are preferably provided with a plurality of bores 21 distributed along their length to permit a uniform and efficient distribution of the cryogenic fluid in the interior of the treatment chambers 2 and 2'.

Each treatment chamber 2 and 2' is provided with a duct 22 interconnecting the same through a blocking valve 23, in order to operate as a pressure equalizing line which is interconnected between both treatment chambers 2 and 2' to assist in the transference of cryogenic fluid form one chamber to the other during operation of the apparatus. It is important to point out that the duct assemblies 11 and 11' may be introduced in chambers 2 and 2' at any other point between their ends without thereby changing the efficiency of the apparatus.

The apparatus 1 is supported on a suitable frame preferably coupled to both chambers 2 and 2', and said frame is in turn rotatably supported on a rotatable drive mechanism which, together with said frame, are generally shown in dotted lines at 24, for permitting the whole apparatus to be rotated on a vertical plane through an angle of up to 180°.

For carrying out the operation of the apparatus described above in connection with FIGS. 1 and 2 of the drawings, said apparatus 1 is placed in a horizontal position by means of drive 24, such that the removable lid 6 of the treatment chamber 2 and the removable lid 6' of the treatment chamber 2' may be removed to permit the feeding of different waste products utilized as raw materials, such as copper and aluminum cables lined with plastics materials as those used as electrical energy conductors, pieces of metal lined with rubber and/or plastics, rubber and/or plastics products combined with textile fibers or metal wires, tires, and the like.

Once the raw material is charged in each one of the treatment chambers 2 and 2', the lids 6 and 6' are placed and hermetically sealed against the respective treatment chambers, and thereafter the valves 17 and 17' for producing vacuum are opened and the vacuum pump 18 is operated in order to permit the extraction of the air which is within said chambers 2 and 2', through the duct assemblies 11 and 11', until a high vacuum is reached. Said valves 17 and 17' are thereafter closed and the apparatus 1 is rotated through 90° in order to place it in a vertical position as shown in FIG. 1, whereby the treatment chamber 2 will be located at the top and the treatment chamber 2' at the bottom of the apparatus. The valve 15 is then opened to inject cryogenic fluid to the treatment chamber 2 for permitting the filling of the same with cryogenic fluid through the duct assembly 11, thus freezing the rubber and/or plastics materials contained in the waste products previously charged, until they reach their crystallization point. Said crystallization points are specific for each one of the different materials used as raw materials, and temperatures of the order of −180° C. may be reached, which is the temperature required to crystalize the vulcanized rubber used, for instance, for the manufacture of tires. Direct contact of the raw materials must be carried out witch those cryogenic fluids that have boiling points which are lower than the crystallization points of said materials, suitable cryogenic fluids for use in the apparatus of the present invention being, for example, helium and nitrogen, having boiling points of −269° C. and −195° C. respectively, at which temperatures the crystallization temperatures of the different plastics and/or vulcanized natural and synthetic rubbers contained in the chambers are easily obtainable.

Once the crystallization points of the different materials used as raw materials are reached, the valve 23 which blocks the line 22 for pressure equalization, as well as the valve 10 of duct 9, are opened, in order to permit the transference of the cryogenic fluid from the treatment chamber 2 to the treatment chamber 2' by gravity. Once the liquid phase of the cryogenic fluid has passed through, the valves 10 and 23 are closed and the apparatus 1 is rotated 90° by means of the drive 24, after which the treatment chamber 2 that was initially at the upper position, will now be at an intermediate or horizontal position. Then the removable lid 6 is opened for discharging the different materials used as raw materials, which are already in a crystalized state, for being transported towards a breaking and screening machine for the crystalized material, to thereafter be sent to a separating machine for metallic materials, plastics, rubbers, textiles and the like.

It is to be noted that for carrying out the stage of discharging the different materials treated within the treatment chamber 2, the position of said chamber will not necessarily have to be a horizontal position such as described above, because optionally the discharge of said waste products that are in a crystalized state, may be improved by rotating the apparatus through an angle of 180°, with which the chamber 2 will be placed at the bottom in a vertical position, from which the crystalized materials may be discharged by merely removing the lid 6 and letting said materials to fall out by the action of gravity, to thereafter rotate the apparatus 1 through an angle of 90° to place said chamber 2 back in the horizontal position as described above. This horizontal position will be maintained until the chamber 2 is reloaded with raw material as will be described hereinbelow, and then the apparatus will be rotated another 90° to place chamber 2' at the top as described.

After discharging the treatment chamber 2 with said chamber located in any one of the two positions described above and after placing said treatment chamber in a horizontal position also as described above, said chamber 2 is again fed with the different waste products used as raw materials and is again subjected to a high vacuum, after closing the lid 6 and again rotating the apparatus 90° so that the chamber 2 returns to the lower position to now operate in a manner similar to the treatment chamber 2' when the latter was at said position.

When said rotation of 180° is ultimately effected, the treatment chamber 2' which now contains the cryogenic fluid and which is already at the top of the apparatus, will be operated in a similar manner to what was already described for the treatment chamber 2 which was initially located at the top. However, in this stage of the operation of the apparatus, cryogenic fluid is injected to chamber 2' only to replenish the amount evaporated in chamber 2, since the liquid phase has been directly transferred from chamber 2 to chamber 2'.

Once the above described first cycle of operation of the apparatus 1 is concluded, the said Cycle is repeated for both treatment chambers 2 and 2', and the cryogenic material must only be replenished because of the evaporation thereof, whereby the apparatus of the present invention, besides being capable of affecting a practically continuous operative cycle without appreciable losses of cryogenic fluid to the atmosphere, also offers the great advantage of permitting to efficiently separate, by means of Cryogenic fluids, plastics materials and/or natural or synthetic vulcanized or non vulcanized rubbers from metallic materials and/or textile fibers to which they may be combined as composites.

Figure 3:
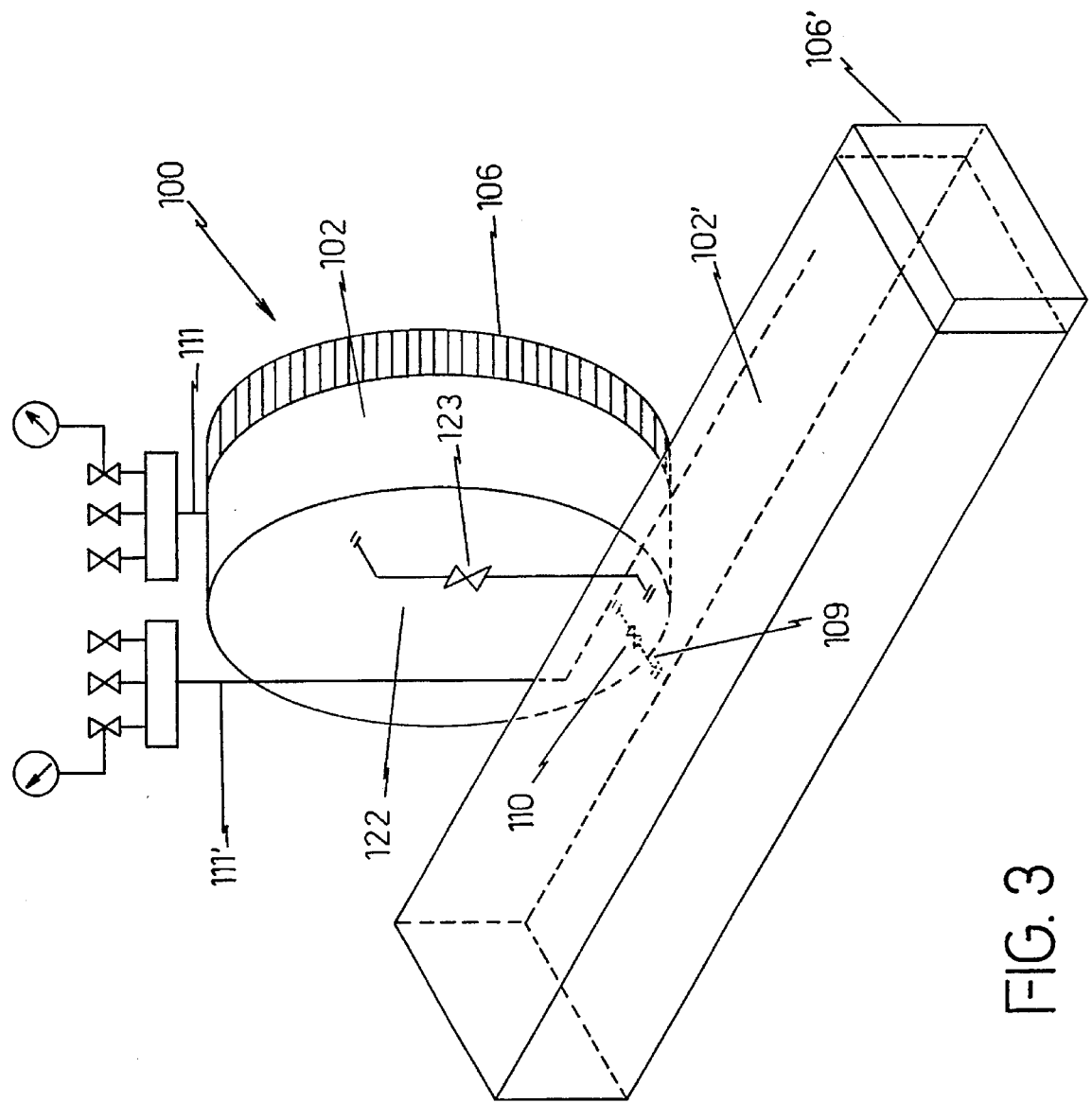
FIG. 3 is a diagrammatic perspective view of an apparatus for cryogenically separating plastics materials and/or natural and synthetic vulcanized or non vulcanized rubbers from metallic materials and/or textile fibers with which they are combined as a composite, built in accordance with a second embodiment of the present invention.
Figure 4:
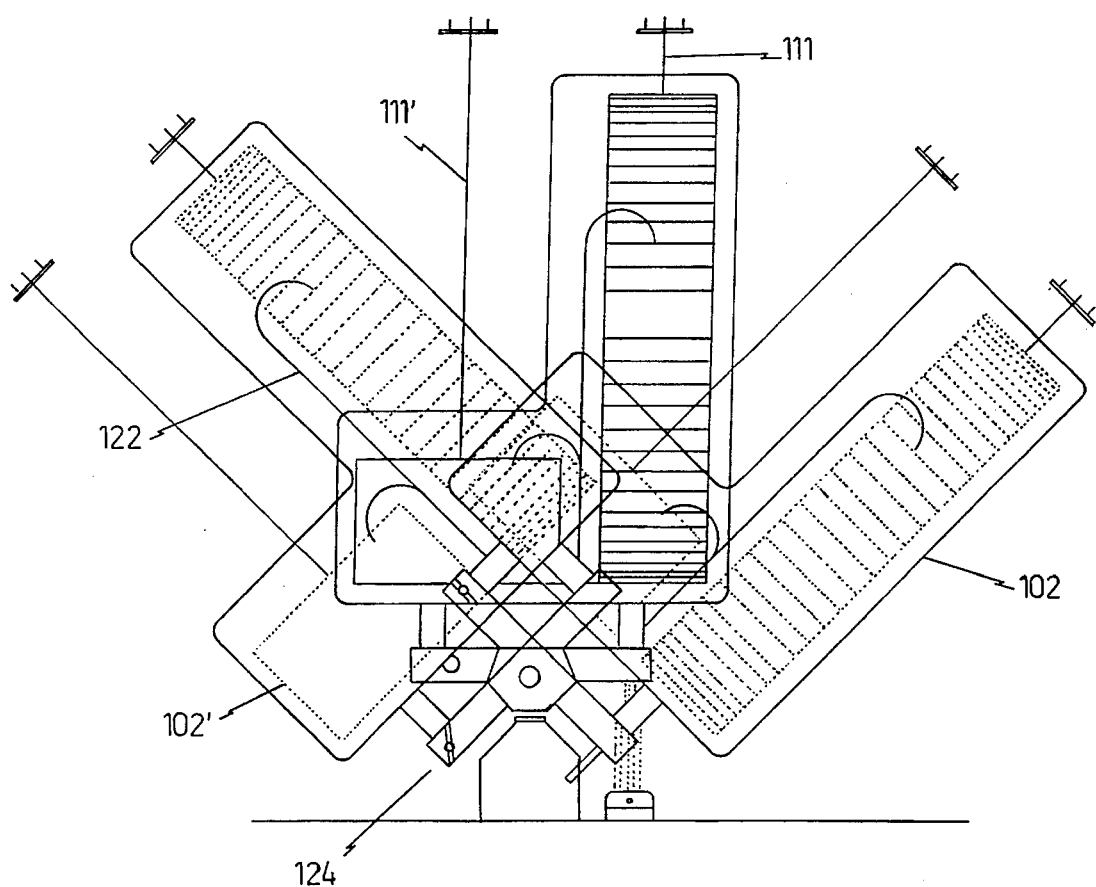
FIG. 4 is a diagrammatic front elevational view of the apparatus illustrated in FIG. 3, showing the apparatus in various angular positions to illustrate its rotational capability during operation.

FIGS. 3 and 4 of the drawings show a second embodiment of the present invention, which comprises an apparatus 100 for cryogenically separating plastics materials and/or natural and synthetic vulcanized or non vulcanized rubbers from metallic materials and/or textile fibers to which they are combined as composites, said apparatus being designed with an operative rotation of about 60° rather than 180° as described above for the apparatus of FIGS. 1 and 2.

The apparatus 100 essentially comprises the same parts of the apparatus 1 of the above described embodiment, with a treatment chamber 102 insulated and with a double wall, preferably of a cylindrical shape similar to that of a drum, and adjacent to said treatment chamber 102, a treatment chamber 102' is provided, preferably with the shape of an elongated rectangular prism, both chambers 102 and 102' being interconnected at their center lower portions, by means of an insulated duct 109 with its respective fast closing and opening valve 110 and by means of a pressure equalizing duct 122 having a valve 123, said pressure equalizing duct interconnecting the upper portions of said chambers.

The treatment chamber 102 comprises an insulated lid 106 which is removable and has a double wall, and preferably is of the dome type, located at the end opposite to the chamber 102', whereas the treatment chamber 102' comprises an insulated removable double wall lid 106', of a rectangular shape and arranged at any one of its ends, depending on the requirements of the design.

Both treatment chambers 102 and 102' are preferably provided with an inner slope at their bottoms of up to 2% in the direction towards the interconnection with the duct 109, such that when the drive mechanism 124 effects a rotation of not more than about 60°, this rotation will be sufficient to transfer all of the liquid phase of the cryogenic fluid contained in the treating chamber 102 towards the treatment chamber 102' and vice-versa, after opening the fast opening and closing valve 110 of the duct 109 which is arranged centrally and at the lower portions of both chambers, and the blocking valve 123 of the line 122 for equalizing pressures, thus permitting that at that moment the flow of the cryogenic fluid be initiated between both chambers and also that a cycle similar to that already described for the apparatus 1 be initiated.

It is to be pointed out that in this second embodiment the duct assembly 111 of the treatment chamber 102, is directly coupled on the upper surface of said chamber 102, while the duct assembly 111' of the treatment chamber 102' is directly coupled on the upper surface of the same, thus facilitating the operation of the apparatus 100 during the sequence of feeding the cryogenic fluid to the respective chambers and of generating a vacuum therein.

It may be seen from the above that the apparatus of the present invention has been devised such that, during operation of the same, a continuous and direct contact be effected between the cryogenic fluid and the different waste products comprising plastics materials and/or natural and synthetic vulcanized or non vulcanized rubbers, in combination with metallic materials and/or textile fibers, until said materials Peach their crystallization point and may be broken and easily separated in other known apparatus suitable for said purpose, whereby the apparatus permits the radical elimination of the contamination generated by the burning of waste products containing rubbers and/or plastics materials for the disposal thereof.

The apparatus of the present invention also permits to carry out the separation of the different materials contained in waste products, by feeding the latter into at least two insulated treatment chambers that receive the cryogenic fluid, in a practically continuous manner and with a very low consumption of cryogenic fluid, since the apparatus of the present invention permits to pass the cryogenic fluid still remaining in the liquid state from one chamber to the other continuously without any appreciable loss of cryogenic fluid to the atmosphere.

Although certain specific embodiments of the present invention have been shown and described above, it is to be understood that many modifications thereof are possible. The present invention, therefore, is not to be restricted except insofar as is necessitated by the prior art and by the spirit of the appended claims.

What is claimed is:

1. An apparatus for cryogenically separating plastics materials and/or synthetic or natural vulcanized or non vulcanized rubbers from metallic and textile materials forming composites therewith, which comprises:

at least two treatment chambers for receiving said composite materials, each of said treatment chambers having a port for permitting the loading of said composite materials and the unloading of cryogenically crystallized treated materials, means for selectively applying cryogenic fluid to each of said chambers to contact and treat the composite material therein, and first duct means for interconnecting said treatment chambers to transfer cryogenic fluid from one chamber to the other.

2. An apparatus according to claim 1 further comprising a removable lid coupled to the port of a respective chamber.

3. An apparatus according to claim 1 further comprising rotatable support means for mounting said treatment chambers capable of being rotated through an angle of up to 180°.

4. An apparatus according to claim 3, wherein the axes of said treatment chambers are collinear such that one chamber will be placed vertically directly above the other in a first position of said support means, both chambers will be located one aside the other in a horizontal arrangement in a second position of said support means, and the other chamber will be placed vertically directly above the one chamber in a third position of said support means.

5. An apparatus according to claim 4 wherein the bottoms of the interior of said chambers have a slope which descends toward the point of connection with said first duct means to secure transfer of the cryogenic fluid from one chamber to the other as said support means is rotated.

6. An apparatus according to claim 5 further comprising manifold means for selectively connecting each of said chambers to cryogenic fluid storage tank means, to vacuum pump means, and to pressure relief means.

7. An apparatus according to claim 1 further comprising manifold means for selectively connecting each of said chambers to cryogenic fluid storage tank means, to vacuum pump means, and to pressure relief means.

8. An apparatus according to claim 7 wherein said manifold means comprises:

safety valve means for alleviating excess pressure from the chambers connected to first pipe means, said first pipe means connected with the interior space of said chambers, second pipe means connected with the interior space of said chambers, vacuum valve means connected to said second pipe means, and cryogenic fluid injection valve means connecting cryogenic fluid storage tank means with said second pipe means.

9. An apparatus according to claim 8 wherein said first pipe means are within said second pipe means for forming a duct assembly.

10. An apparatus according to claim 9 wherein said duct assembly extends into the interior space of each said chamber a predetermined distance, said second pipe means having a plurality of bores along the portion in the interior of a said chamber for distributing cryogenic fluid injected therethrough into a said chamber.

11. An apparatus according to claim 1 wherein said chambers are adjacent to each other, said first duct means interconnecting the lower portions of said chambers, a rotatable support for said chambers, rotation of said support through an angle of at least 60° for transferring cryogenic fluid from one chamber to the other through said first duct means.

12. An apparatus according to claim 11 wherein the bottoms of the interior of said chambers have a slope which descends toward the point of connection with said first duct means to secure transfer of the cryogenic fluid from one chamber to the other as said support means is rotated.

13. An apparatus according to claim 11 further comprising second duct means interconnecting the upper portions of said chambers with each other to equalize the pressures in said chambers.

* * * * *